United States Patent [19]
>
> Ando et al.
>
> [11] Patent Number: 4,599,115
>
> [45] Date of Patent: Jul. 8, 1986

[54] METHOD FOR CONTROLLING SIMULATED MOVING BED SYSTEM

[75] Inventors: Masao Ando, Saitama; Masatake Tanimura, Kanagawa, both of Japan

[73] Assignee: Mitsubishi-Kasei Technoengineers Ltd., Tokyo, Japan

[21] Appl. No.: 634,006

[22] Filed: Jul. 24, 1984

[30] Foreign Application Priority Data

Aug. 12, 1983 [JP] Japan .................... 58-147712

[51] Int. Cl.$^4$ ............... C13J 1/06; C13J 1/08
[52] U.S. Cl. ..................... 127/46.1; 55/21; 210/656; 210/741; 422/112
[58] Field of Search ............. 127/46.1–46.3; 210/656, 198.2, 741; 137/566; 55/21; 422/112, 116

[56] References Cited

U.S. PATENT DOCUMENTS 3,268,604  8/1966  Boyd, Jr. ................. 55/75 X
4,182,633  1/1980  Ishikawa et al. ........... 127/46.2
4,332,623  6/1982  Ando et al. .............. 127/46.2

FOREIGN PATENT DOCUMENTS 54-90072  7/1979  Japan .

OTHER PUBLICATIONS

Karassik et al., *Pump Handbook*, (1976), pp. 7–9, McGraw Hill Book Co.

*Primary Examiner*—Richard V. Fisher
*Assistant Examiner*—W. Gary Jones
*Attorney, Agent, or Firm*—Sughrue, Mion, Zinn, Macpeak & Seas

[57] ABSTRACT

A method is disclosed for controlling a simulated moving bed system of a type including at least four series-arranged beds each packed with a solid adsorbent, with the downstream end of each bed and the upstream end of the next succeeding bed being connected by conduits to form an endless loop, and in which a fluid is caused to circulate through the beds in one direction, a feed stock and a desorbent are introduced into the system while a raffinate and a sorbate are withdrawn from the system, and the positions of introduction and withdrawal of the four kinds of fluid are periodically shifted in the direction of the circulating fluid flow. In accordance with the invention, two or more circulating pumps, provided with variable speed controllers and pressure detectors for detecting the suction pressure of each of the circulating pumps, are disposed between two beds. The flow rates of three of the four fluids introduced into or withdrawn from the system are adjusted to predetermined values, and the flow rate of the other fluid is controlled in such a manner that the suction pressure of one of the circulating pumps or the average of the suction pressures of two or more of the circulating pumps is held constant, and a rotational speed of each of the circulating pumps is controlled independently so as to control the flow rate of the circulating fluid and to maintain the suction pressure of each circulating pump at a low level.

4 Claims, 3 Drawing Figures

METHOD FOR CONTROLLING SIMULATED MOVING BED SYSTEM

BACKGROUND OF THE INVENTION

The present invention relates to a method for controlling a simulated moving bed system. More particularly, the invention relates to a method for minimizing the peak pressure of a simulated moving bed system by using variable speed centrifugal pumps.

A simulated moving bed system is known for chromatographic separation, which system is extensively used in industry for separating hydrocarbon or saccharide mixtures.

A simulated moving bed system generally consists of several beds each packed with a solid adsorbent, with the downstream end of each bed and the upstream end of the next succeeding bed being connected by conduits to form an endless loop. A fluid is circulated through the beds in one direction, a feed stock and a desorbent are introduced into the system, and at the same time, a raffinate (nonadsorbed component) and a sorbate (adsorbed component) are withdrawn from the system. The positions of introduction and withdrawal of these four kinds of fluid (hereunder referred to as side streams) are periodically shifted in the direction of the circulating fluid flow to effect chromatographic separation of the respective components. Several proposed methods for controlling the operation of this simulated moving bed system are described in Japanese Patent Publication No. 18392/76 and Japanese non-examined Publications (OPI) Nos. 88274/78 (corresponding to U.S. Pat. No. 4,182,633) and 90072/79.

In the operation of the simulated moving bed system, the flow rates of three of the four side streams are usually controlled by setting them to predetermined values, whereas the other side stream is controlled by a control valve that maintains the pressure in the bed at a constant level. When only one circulating pump is positioned in the conduits, the suction pressure of the pump provides the lowest pressure in the system, and the last of the above-mentioned side stream is usually controlled so that the suction pressure of the circulating pump is held constant. The function of the circulating pump is to compensate for the pressure drop occurring in the beds. Therefore, when only one circulating pump is used, its discharge pressure is equal to the sum of its suction pressure and the pressure drop in the beds, and thus the beds must be designated for pressure vessels that withstand this discharge pressure. This means a high construction cost is incurred if the pressure drop in the beds is to be great.

Theoretically, the pressure drop in the beds can be reduced by decreasing the ratio of the length of its straight section to its diameter (generally referred to as the L/D ratio of the bed). However, this is not a completely satisfactory solution in practice since a large-diameter bed presents difficulties in providing a uniform fluid flow and requires a large cost and installation area.

In order to reduce the designed pressure of the beds, several unit beds are arranged in series, connected by conduits to form an endless loop and equipped with two or more circulating pumps in the conduits in such a manner that the pressure drop occurring in the beds is distributed among the respective pumps.

However, in the simulated moving bed system, the respective components in the circulating fluid provide a given concentration distribution, and in the particular case of separation of a mixture of saccharides, the respective components have different viscosities or specific densities according to their concentration distribution. This means the pressure drop differs from one unit bed to another and that the pressure distribution among the unit beds tends to vary over time. Therefore, the suction pressure and discharge pressure of a given circulating pump will experience periodic variations. Furthermore, side streams are introduced into or withdrawn from the system so that the fluid flow varies from one zone of the bed to another. The control of the simulated moving bed system is further complicated by the fact that zones having different flow rates of the circulating fluid are shifted periodically.

The present inventors previously disclosed, in Japanese non-examined Publication No. 90072/79, a method for controlling a simulated moving bed system. This method depends on the finding that peak pressure in the system can be reduced by controlling the side streams at each phase of the operation in such a manner that the minimum or maximum value of the suction pressure or discharge pressure of the circulating pumps in the system is held constant.

SUMMARY OF THE INVENTION

The present invention is a further improvement on this method. The method of the invention enables the use of a simulated moving bed system characterized by a significant reduction in the designed pressure and operating power requirement, as well as by an increased L/D ratio. Therefore, the overall size of the separator is reduced, and its construction and operating costs are also reduced.

The present invention provides a method of controlling a simulated moving bed system comprising at least four series-arranged beds each packed with a solid adsorbent, with the downstream end of each bed and the upstream end of the next succeeding bed being connected by conduits to form an endless loop and in which a fluid is caused to circulate through the beds in one direction, a feed stock and a desorbent fluid are introduced into the system while at the same time, a sorbate and a raffinate are withdrawn from the system, and the positions of introduction and withdrawal of these four side streams are arranged in the direction of the circulating fluid flow and periodically shifted. According to the present invention, two or more circulating pumps equipped with variable speed controllers and pressure detectors for detecting the suction pressure of each of the circulating pumps are disposed between two beds, the flow rates of three of the four side streams which are introduced into or withdrawn from the system are adjusted to predetermined values, whereas the flow rate of the other fluid is controlled in such a manner that the suction pressure of one circulating pump or the average of the suction pressures of two or more circulating pumps is held constant, and the rotational speed of each circulating pump is controlled independently so as to control the flow rate of the circulating fluid and to maintain the suction pressure of each circulating pump at a low level.

The simulated moving bed system of the present invention includes four or more series-connected unit beds. Two or more circulating pumps are provided between the beds, preferably between each of the unit beds. The suction pressure of each circulating pump is detected by the pressure detector, and in order to minimize this suction pressure, the rotational speed of each circulating pump is controlled by the variable speed controller, thereby determining the flow rate and pressure of the fluid being discharged from each circulating pump. The rotational speed of the circulating pump is controlled mechanically or electrically. For this purpose, a so-called variable-voltage variable-frequency controller, a type of inverter which has recently been used for such applications, can be employed.

According to the method of the present invention, the flow rates of three of the four side streams are adjusted to predetermined values, whereas the flow rate of the other side stream is controlled in such a manner that the suction pressure of any one of the circulating pumps, or the maximum or minimum suction pressure, or the average of the suction pressures of two or more circulating pumps is held constant. At the same time, the circulating pumps are independently controlled so that their rotational speeds are such as to realize the necessary flow rate through a specific pump as well as the discharge pressure thereof which compensates for the pressure drop occurring in the bed downstream of that specific circulating pump. When doing so, the suction pressure of each circulating pump must be sufficient to avoid cavitation.

In a preferred embodiment, the rotational speed of one circulating pump is controlled so that it provides a circulation flow at a predetermined level, whereas the rotational speeds of the other circulating pumps are so controlled that the pump positioned immediately downstream of each pump has the lowest possible suction pressure.

DESCRIPTION OF THE PREFERRED EMBODIMENTS

The advantages of the present invention will become apparent from the following results of experiments obtained with three prototypes of a simulated moving bed system composed of eight unit beds.

Figure 1:
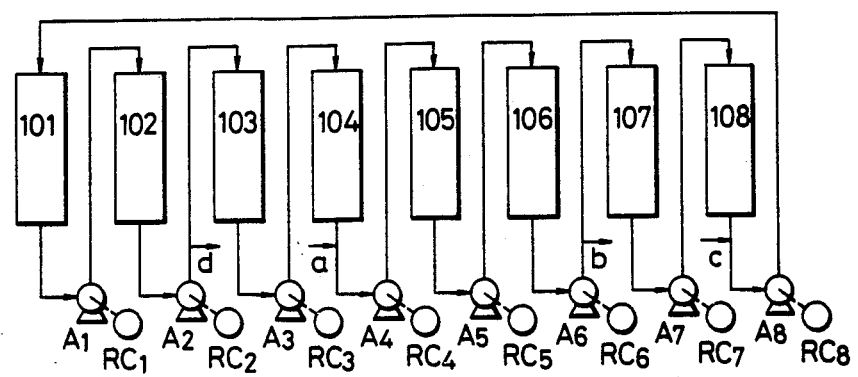
FIGS. 1 to 3 are schematic diagrams of three different simulated moving bed systems, each composed of eight unit beds.

FIG. 1 shows the layout for the most basic construction of the simulated moving bed system used in the method of the present invention in which reference numerals 101 to 108 indicate unit beds; $A_1$ to $A_8$, circulating pumps; $RC_1$ to $RC_8$, devices for controlling the rotational speed of the respective circulating pumps; a, feed stock; b, raffinate; c, desorbent; and d, sorbate.

Figure 2:
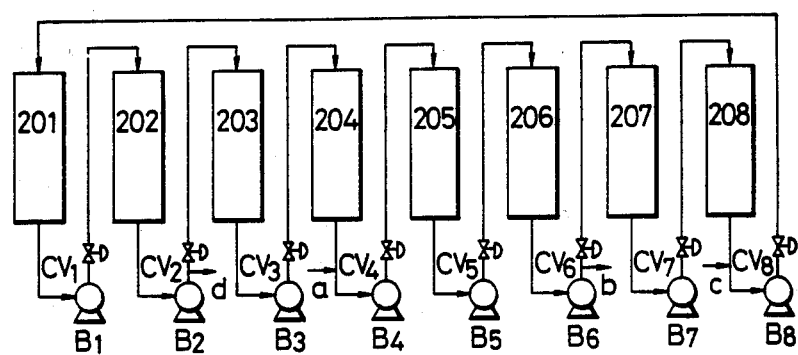

FIG. 2 shows the layout for the most basic construction of the simulated moving bed system used in the method proposed by the present inventors in Japanese non-examined Patent Publication No. 90072/79. In FIG. 2, 201 to 208 indicate unit beds; $B_1$ to $B_8$, circulating pumps; $CV_1$ to $CV_8$, circulation flow control valves; a, feed stock; b, raffinate; c, desorbent; and d, sorbate.

Figure 3:
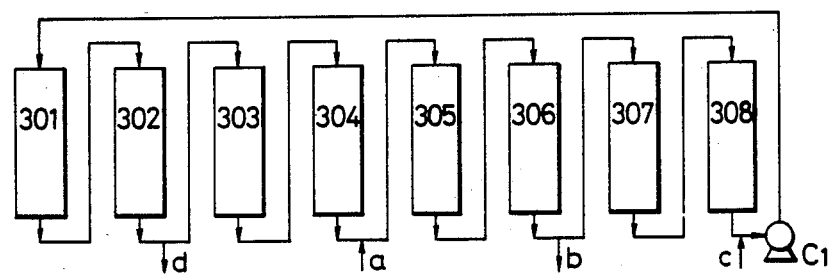

FIG. 3 shows the basic layout of a simulated moving bed system using a single unit of a circulating pump. In FIG. 3, 301 to 308 indicate unit beds; $C_1$, a circulating pump; a, feed stock; b, raffinate; c, desorbent; and d, sorbate.

The simulated moving bed systems shown in FIGS. 1 to 3 are used to separate an aqueous solution of high-fructose corn syrup (feed stock) into fructose (sorbate) and dextrose (raffinate) using water as a desorbent. At the point of time when the positions of introduction and withdrawal of the four side streams were as shown in FIGS. 1 to 3, the respective unit beds of the simulated moving bed system had the following pressure drop values:

TABLE 1

| Unit bed | | Pressure drop (kg/cm$^2$) |
|---|---|---|
| First | (101, 201, 301) | 1.02 |
| Second | (102, 202, 302) | 1.47 |
| Third | (103, 203, 303) | 2.47 |
| Fourth | (104, 204, 304) | 4.44 |
| Fifth | (105, 205, 305) | 5.24 |
| Sixth | (106, 206, 306) | 2.74 |
| Seventh | (107, 207, 307) | 1.05 |
| Eighth | (108, 208, 308) | 0.73 |

If it is assumed that the minimum pressure in the simulated moving bed system required for preventing cavitation from occurring in the circulating pumps is 0.5 kg/cm$^2$G, the discharge pressure required for the circulating pump $C_1$ shown in FIG. 3 is 19.66 kg/cm$^2$G, which is the sum of its suction pressure (0.5 kg/cm$^2$G) and the total pressure drop indicated in Table 1.

In the operation of the system shown in FIG. 2, the flow rate of the circulating fluid is controlled by control valves $CV_1$ to $CV_8$. In the embodiment of FIG. 2, the suction pressure of the circulating pump $B_6$ provides the minimum pressure in the simulated moving bed system. By holding this minimum pressure at 0.5 kg/cm$^2$G, the pressure at various points of the system and the pressure drops in control valves $CV_1$ to $CV_8$ had the following values.

TABLE 2

| No. | Pressure at inlet to unit bed (kg/cm$^2$G) | Suction pressure of circulating pump (kg/cm$^2$G) | Discharge pressure of circulating pump (kg/cm$^2$G) | Pressure drop in CV (kg/cm$^2$G) |
|---|---|---|---|---|
| 1 | 6.23 | 5.21 | 8.45 | 1.31 |
| 2 | 7.14 | 5.67 | 9.28 | 1.08 |
| 3 | 8.20 | 5.73 | 9.69 | 1.15 |
| 4 | 8.54 | 4.10 | 8.09 | 1.77 |
| 5 | 6.32 | 1.08 | 4.98 | 1.74 |
| 6 | 3.24 | 0.50 | 4.19 | 0.81 |
| 7 | 3.38 | 2.33 | 5.76 | 0.73 |
| 8 | 5.03 | 4.30 | 7.53 | 1.30 |

As Table 2 shows, when the simulated moving bed system of FIG. 2 is used, the peak value of the pressure in the system is 9.69 kg/cm$^2$G, but the total pressure drop occurring in the control valves reaches 9.89 kg/cm$^2$G. In other words, about a third of the input power to the pumps is wasted in the form of pressure drops in the control valves.

In the operation of the system shown in FIG. 1, the flow rate of one of the side streams and the rotational speed of the circulating pumps were controlled, according to the method of the present invention, so that the suction pressure of each circulating pump was 0.5 kg/cm$^2$G. As a result, the respective pumps had the following discharge pressure values:

TABLE 3

| Pump No. | $A_1$ | $A_2$ | $A_3$ | $A_4$ | $A_5$ | $A_6$ | $A_7$ | $A_8$ |
|---|---|---|---|---|---|---|---|---|
| Discharge pressure (kg/cm$^2$G) | 1.97 | 2.97 | 4.94 | 5.75 | 3.24 | 1.55 | 1.23 | 1.52 |

The peak values of pressure in the simulated moving bed system of the above three cases are shown in Table 4, together with the values of the specific power required for operating the respective systems (the power requirement of the system of FIG. 1 was taken as 1.0).

TABLE 4

|  | System of FIG. 1 | System of FIG. 2 | System of FIG. 3 |
| --- | --- | --- | --- |
| Maximum pressure ($kg/cm^2 G$) | 5.75 | 9.69 | 19.66 |
| Specific power requirement | 1.0 | 1.7 | 1.0 |

Table 4 shows that the method of the present invention achieves the lowest peak value in the simulated moving bed system while requiring less power in operation than the system shown in FIG. 2.

We claim:

1. In a method for controlling a simulated moving bed system comprising at least four series-arranged beds each packed with a solid adsorbent, with the downstream end of each bed and the upstream end of the next succeeding bed being connected by conduits to form an endless loop, and in which a fluid feed stock, a fluid desorbent, a fluid raffinate and a fluid sorbate is caused to circulate through said beds in one direction, said fluid feed stock and said fluid desorbent are introduced into the system while at the same time said fluid raffinate and said fluid sorbate are withdrawn from said system, and the positions of introduction and withdrawal of said fluids are periodically shifted in the direction of the circulating fluid flow, the improvement wherein two or more circulating pumps provided with variable speed controllers and pressure detectors for detecting a suction pressure of each of said circulating pumps are disposed between two beds, flow rates of three of the fluids introduced into or withdrawn from the system are adjusted to predetermined values and a flow rate of the other fluid is controlled in such a manner that the suction pressure of one of said circulating pumps is held constant, and a rotational speed of each of said circulating pumps is controlled independently so as to control the flow rate of the circulating fluid and to maintain the suction pressure of each circulating pump at a low level.

2. The method for controlling a simulated moving bed system of claim 1, wherein said circulating pumps are provided between each of said beds.

3. In a method for controlling a simulated moving bed system comprising at least four series-arranged beds each packed with a solid adsorbent, with the downstream end of each bed and the upstream end of the next succeeding bed being connected by conduits to form an endless loop, and in which a fluid feed stock, a fluid desorbent, a fluid raffinate and a fluid sorbate is caused to circulate through said bed in one direction, said fluid feed stock and said fluid desorbent are introduced into the system while at the same time said fluid raffinate and said fluid sorbate are withdrawn from said system, and the positions of introduction and withdrawal of said fluids are periodically shifted in the direction of the circulating fluid flow, the improvement wherein two or more circulating pumps provided with variable speed controllers and pressure detectors for detecting a suction pressure of each of said circulating pumps are disposed between two beds, flow rates of three of the fluids introduced into or withdrawn from the system are adjusted to predetermined values and a flow rate of the other fluid is controlled in such a manner that an average of the suction pressures of two or more of said circulating pumps is held constant, and a rotational speed of each of said circulating pumps is controlled independently so as to control the flow rate of the circulating fluid and to maintain the suction pressure of each circulating pump at a low level.

4. The method for controlling a simulated moving bed system of claim 3, wherein said circulating pumps are provided between each of said beds.

* * * * *

REEXAMINATION CERTIFICATE (883rd)
United States Patent [19]
Ando et al.

[11] B1 4,599,115
[45] Certificate Issued  Jun. 28, 1988

[54] METHOD FOR CONTROLLING SIMULATED MOVING BED SYSTEM

[75] Inventors: Masao Ando, Saitama; Masatake Tanimura, Kanagawa, both of Japan

[73] Assignee: Mitsubishi-Kasei Technoengineers Ltd., Tokyo, Japan

Reexamination Request:
No. 90/001,262, Jun. 15, 1987

Reexamination Certificate for:
Patent No.: 4,599,115
Issued: Jul. 8, 1986
Appl. No.: 634,006
Filed: Jul. 24, 1984

[30] Foreign Application Priority Data

Aug. 12, 1983 [JP] Japan .................. 58-147712

[51] Int. Cl.⁴ ................ C13J 1/06; C13J 1/08
[52] U.S. Cl. .................... 127/46.1; 55/21; 210/656; 210/741; 422/112
[58] Field of Search ................ 127/46.1–46.3; 210/656, 198.2, 741; 137/566; 55/21; 422/112, 116

[56] References Cited

U.S. PATENT DOCUMENTS

3,268,604  8/1966  Boyd .
4,412,866  11/1983  Schoenrock et al. ........... 127/46.2

FOREIGN PATENT DOCUMENTS

WO82/04265  12/1982  PCT Int'l Appl. .

OTHER PUBLICATIONS

Patents Abstracts of Japan, vol. 3, No. 109, 9/12/79, p. 144 C 58; and JP-A-54 90072 (Mitsubishi Kasei Kogyo K.K.) published 7/17/79.
Karassik et al., Pump Handbook, (1976), pp. 7–9, McGraw Hill Book Co.

*Primary Examiner*—Richard V. Fisher

[57] ABSTRACT

A method is disclosed for controlling a simulated moving bed system of a type including at least four series-arranged beds each packed with a solid adsorbent, with the downstream end of each bed and the upstream end of the next succeeding bed being connected by conduits to form an endless loop, and in which a fluid is caused to circulate through the beds in one direction, a feed stock and a desorbent are introduced into the system while a raffinate and a sorbate are withdrawn from the system, and the positions of introduction and withdrawal of the four kinds of fluid are periodically shifted in the direction of the circulating fluid flow. In accordance with the invention, two or more circulating pumps, provided with variable speed controllers and pressure detectors for detecting the suction pressure of each of the circulating pumps, are disposed between two beds. The flow rates of three of the four fluids introduced into or withdrawn from the system are adjusted to predetermined values, and the flow rate of the other fluid is controlled in such a manner that the suction pressure of one of the circulating pumps or the average of the suction pressures of two or more of the circulating pumps is held constant, and a rotational speed of each of the circulating pumps is controlled independently so as to control the flow rate of the circulating fluid and to maintain the suction pressure of each circulating pump at a low level.

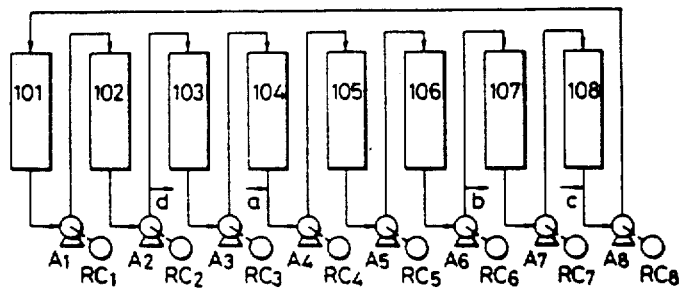

REEXAMINATION CERTIFICATE ISSUED UNDER 35 U.S.C. 307

NO AMENDMENTS HAVE BEEN MADE TO THE PATENT

AS A RESULT OF REEXAMINATION, IT HAS BEEN DETERMINED THAT:

The patentability of claims 1-4 is confirmed.

* * * * *